J. KRANNICHFELDT.
PROCESS FOR PRODUCING PERFORATED TUBULAR ELECTRODES FOR ACCUMULATORS.
APPLICATION FILED NOV. 25, 1914.

1,127,025.  
Patented Feb. 2, 1915.

WITNESSES

INVENTOR  
Johann Krannichfeldt  
BY  
ATTORNEYS

UNITED STATES PATENT OFFICE.

JOHANN KRANNICHFELDT, OF COLOGNE-NIEHL, GERMANY.

PROCESS FOR PRODUCING PERFORATED TUBULAR ELECTRODES FOR ACCUMULATORS.

1,127,025.  Specification of Letters Patent.  Patented Feb. 2, 1915.

Application filed November 25, 1914. Serial No. 874,095.

*To all whom it may concern:*

Be it known that I, JOHANN KRANNICHFELDT, a subject of the King of Prussia, residing at Cologne-Niehl-on-the-Rhine, in the Kingdom of Prussia, German Empire, have invented new and useful Improvements in Processes for Producing Perforated Tubular Electrodes for Accumulators, of which the following is a specification.

In the electrodes of accumulators having a tubular outside wall said outside wall is perforated, in order to allow the electrolyte to better penetrate to the active mass contained in the tubes. If the perforations in the external wall are filled with the active mass, the internal resistance of the accumulator is increased. According to the present invention these drawbacks are overcome by covering the holes with paper or the like on the inside of the tubes before filling said tubes with the active mass. The filled tubes or accumulators are then inserted into a liquid, such as dilute sulfuric acid, glycerin or the like, which hardens the active mass. When dry the conversion of the active mass is effected. During this operation and the first charges the paper or the like is destroyed, so that then the holes remain open. The destruction of the paper can be accelerated by the use of a strong acid.

Figure 1:
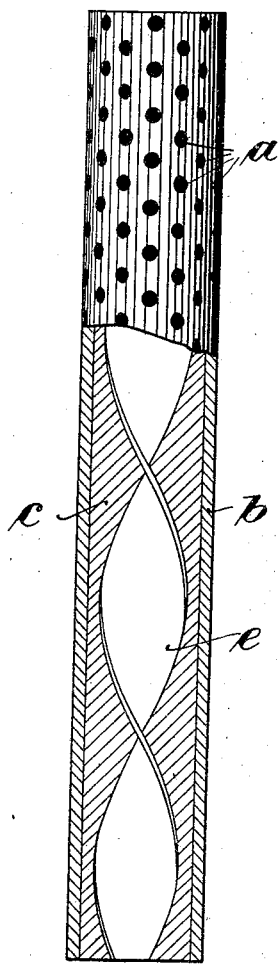
Figure 2:
Figure 3:
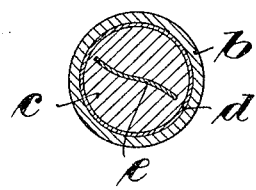

In the accompanying drawing a perforated electrode is shown by way of example, Figure 1 being a front elevation and part section of said electrode, Fig. 2 a longitudinal section of the outer tube alone with the paper lining, Fig. 3 a cross section of a tube filled with the active mass but before the paper has been destroyed.

The perforations $a$ of the tube $b$ are not filled up by the active mass $c$, but remain open. In Figs. 2 and 3 the paper or the like lining used to cover the holes is shown at $d$. This lining is destroyed after the active mass $c$ has been hardened.

$e$ is the central electric conductor.

What I claim and desire to secure by Letters Patent of the United States is:—

1. The process for producing perforated tubular electrodes for accumulators which consists in covering the openings of the tubes with paper on the inside of the tube, filling said tubes with active mass, hardening said active mass and in destroying said paper by an acid, substantially as, and for the purpose, set forth.

2. The process for producing perforated tubular electrodes for accumulators which consists in covering the openings of the tubes with paper on the inside of the tube, filling said tubes with active mass, hardening said active mass and in accelerating the destruction of the paper by filling the accumulator formed by said tubes with a strong acid, substantially as, and for the purpose, set forth.

In testimony whereof I have signed my name to this specification in the presence of two subscribing witnesses.

JOHANN KRANNICHFELDT.

Witnesses:
J. WYNEN,
J. K. ZIESECK.